Sept. 22, 1953    M. C. KETCHUM ET AL    2,652,741
BLIND RIVET WITH CLINCHER
Filed Aug. 4, 1950
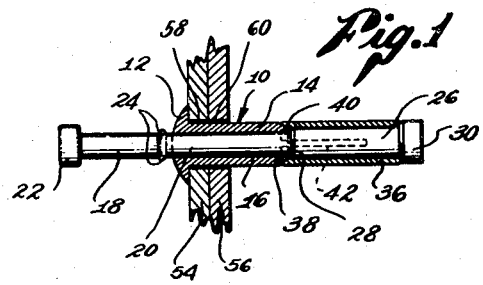
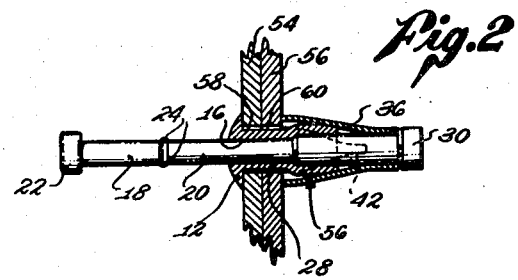
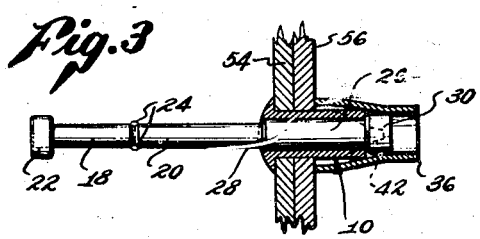
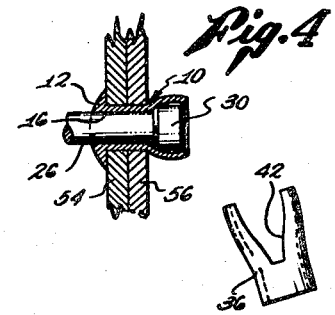
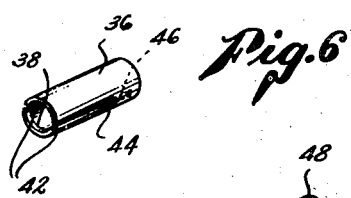
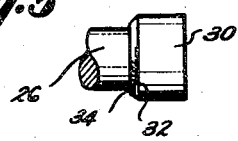
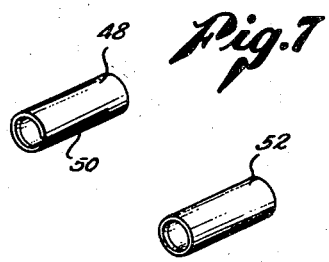
INVENTORS
MILO C. KETCHUM
BY JAMES O. HUFFMAN
Wm Edward Hann
Attorney

Patented Sept. 22, 1953  2,652,741

UNITED STATES PATENT OFFICE 2,652,741

BLIND RIVET WITH CLINCHER

Milo C. Ketchum, Altadena, and James O. Huffman, Los Angeles, Calif., assignors to Cherry Rivet Company, Los Angeles, Calif., a corporation of California Application August 4, 1950, Serial No. 177,635

6 Claims. (Cl. 85—40)

This invention relates to a blind rivet construction and more particularly to one which has a clincher associated therewith. A clincher functions to press two pieces of work to be joined between the clincher and the head of the rivet body in order that the work pieces are in the desired close positional relationship when the rivet shank is expanded in the holes through the work so that the work pieces will be tightly united when the rivet shank is upset or expanded on the opposite side of the joined work pieces from the rivet head.

One of the disadvantages encountered in rivets heretofore provided with clinchers is that the clincher gives or breaks away from the rivet mandrel before the work pieces are securely engaged by the expanding rivet, thereby giving the work pieces an opportunity to spring apart before the riveting operation is completed.

Objects of the present invention are to provide a bored blind rivet having a mandrel for expanding the same, with a clincher which will keep the pieces of work to be joined pressed tightly together until the rivet shank has been expanded sufficiently to firmly engage the work pieces and hold them together; to provide a rivet including a rivet shank engaging plug on the mandrel and a clincher having such relative positional relationship to the plug that the work pieces will be held together by the clincher until the plug has had an opportunity to expand the rivet shank; to provide a rivet unit including a mandrel with a trailing head which is so designed that it will insure the maintenance of the desired pressure of the clincher against the work; to provide a rivet shank which is so constructed that the clincher will readily expand over it and permit the clincher to move telescopically along the rivet shank until it engages the work; and to provide an improved clincher per se.

Other objects and advantages will more fully appear from the following description made in connection with the accompanying drawing.

Fig. 1 is a vertical sectional view through a rivet assembly and a pair of work pieces to be joined, showing the rivet inserted but prior to the initial fastening operation.

Fig. 2 is a view similar to Fig. 1 but with the clincher engaging the work and the projecting portion of the rivet stem expanded by the mandrel plug.

Fig. 3 is a similar view in a further stage with the entire rivet shank expanded and the mandrel head passing through the trailing end of the clincher.

Fig. 4 is a view showing the clincher dropping from the rivet shank and mandrel head and also showing the projecting end of the rivet shank expanded to a second stage.

Fig. 5 is an enlarged fragmentary view of the mandrel head section.

Figs. 6, 7 and 8 are perspective views of different types of clinchers per se.

In Figs. 1 through 3 there is shown a rivet assembly including a rivet body 10 having a rounded head 12 and a cylindrical shank 14. The head and shank are provided with a bore 16 which is adapted to slidably receive a mandrel 18. The mandrel has an intermediate portion 20 of a diameter which will fairly closely yet slidably fit the bore 16. The left or leading end of the mandrel 18 is provided with an enlargement 22 which permits it to be gripped by a tool which is held against the rivet head 12 and which will pull the mandrel through the rivet toward the left, as viewed in Figs. 1 through 3. The mandrel portion 20 is provided with projecting ears 24 to approximately position the rivet body 10 in the location desired for starting of the rivet operation.

To the right or toward the trailing end of the mandrel 18 is a plug section 26 of slightly enlarged diameter. The leading or left end of the plug section is tapered as shown at 28 so it can enter and expand the rivet shank 14 when tension is applied to the mandrel. Immediately behind the trailing end of the plug portion 26 is a mandrel head 30. As shown in Fig. 5, this head has a leading tapered portion 32 with a flat shoulder 34 immediately in front of it.

Lying about the mandrel plug 26 is a cylindrical clincher 36 whose right or trailing end bears against the shoulder 34 on the leading end of the mandrel head 30. The cylindrical clincher 36 is of such length as to extend from the abutment surface 34 to a point preferably a short distance beyond the left or leading end of the plug 26. The left or leading end of the clincher 36 is internally tapered as shown at 38 and is adapted to engage a taper 40 on the inner or right end of the rivet shank 14. It is preferred that the outer diameter of the rivet shank 14, the clincher 36 and the mandrel head 30 be approximately the same so they will readily pass through apertures of a minimum size in the pieces of work to be joined.

Fig. 6 shows the clincher 36. It is provided with a pair of slots 42 which extend from the left or leading end of the clincher to points 44 spaced from the trailing end thereof. The depth of each slot 42 can be varied, as indicated by the broken line 46 in Fig. 6 to vary the effective strength of the clincher, as will be brought out below.

Fig. 7 shows a clincher 48 having a single slot 50 and Fig. 8 shows a clincher 52 which has no slot therein.

It should be understood that the effective strength of the clincher can be determined and varied not only by the use of a slot or slots but also by varying the thickness of the wall of the clincher and the material from which the clincher is made.

Figs. 1 through 4 illustrate several successive steps in the riveting of a pair of work pieces 54 and 56. The rivet unit has been previously assembled in a manner which will not be set forth herein since it is well known in the art. The rivet unit is inserted through apertures 58 and 60 in the work pieces 54 and 56, respectively, insertion being made from left to right as viewed in the drawing. A riveting gun is placed with a relatively stationary portion thereof bearing against the rivet head 12 with pressure applied toward the work piece 54. A movable portion of the gun grips the enlargement 22 on the left or leading end of the mandrel 18 and the mandrel is pulled to the left.

Initial movement of the mandrel will cause its trailing head portion 30 to move the clincher 36 to the left, causing said clincher to expand slightly about the tapered portion 40 of the rivet shank 14. Immediately after the leading or left end of the clincher 36 expands and begins to slide over the rivet shank 14, the tapered leading end 28 of the mandrel plug 26 will enter the right end of the rivet shank and expand it. Upon further movement of the mandrel the left or leading end of the clincher 36 will engage the face of the work piece 56 and press said work piece 56 against the work piece 54, the latter being held by opposing pressure exerted on the rivet head 12. Thus it will be seen that the clincher 36 which is slightly ahead of the tapered leading end of the plug 26 has an opportunity to press the work pieces together before the plug 26 expands the rivet shank in the work piece apertures 58 and 60.

Upon further movement of the mandrel from the position of Fig. 2, the clincher 36 will present considerable resistance. An appreciable amount of force is being applied on the clincher by reason of the fact that its right or trailing end is engaged by the abutment surface 34 on the leading end of the mandrel head 30. However, sufficient tension exerted on the mandrel will cause the leading portion of the mandrel head 30 to force its way into the trailing end of the clincher. As this occurs the mandrel plug 26 will expand the entire rivet shank 14. As this is being done the clincher is still relatively tightly engaging the mandrel head 30, at least until the leading end of the plug 26 has expanded part of the rivet shank which lies in the aperture 60 of the work piece 56.

Further movement of the mandrel 18 to the left will cause the mandrel head 30 to pull through the clincher which will drop away, as shown in Fig. 4, as the mandrel head enters and expands the projecting portion of the rivet shank 14.

The abutment 34 on the leading end of the mandrel head 30 permits considerably greater pressure to be applied on the clincher before the head enters the clincher, as would occur if the mandrel head taper 32 extended forwardly to the diameter of the mandrel plug 26.

From the foregoing, it will be seen that we have provided a clincher which is eventually displaced from the rivet unit and which will firmly press the work pieces together and hold them together until the mandrel plug has expanded the rivet shank sufficiently to prevent the work pieces from springing apart when the clincher pressure is relieved. The clincher is compactly arranged on the rivet unit and does not require any larger apertures through the work than that required by the rivet shank and the riveting operation can be carried out in the conventional manner since no additional operations or steps are required over those necessary for setting an ordinary blind rivet without a clincher.

It is to be understood that changes can be made in the specific form and details without departing from the spirit of the invention.

We claim:

1. In a blind rivet, a rivet body having a head and a shank with a bore extending therethrough, a mandrel extending through said bore, an enlarged plug on said mandrel of a size to enter and expand the entire shank of the rivet when the mandrel is drawn through the shank and being at least substantially as long as said rivet shank, said plug having a shank entrant end and a trailing end, an enlarged head on the end of the mandrel adjacent the trailing end of the plug and of greater size than the plug, a clincher on the mandrel lying about said plug, the forward portion of the clincher being more readily expandable than the end portion adjacent said mandrel head, said clincher being movable relative to said plug and the clincher lying about the plug and extending from adjacent the entrant end of the plug rearwardly to the mandrel head, said rivet shank, clincher and mandrel head having substantially equal and aligned peripheries.

2. The structure in claim 1, and said mandrel head having a tapered leading portion whose greatest size is greater than the bore of the clincher, whereby the mandrel head will not enter and be forced through the clincher without appreciable resistance of the clincher due to contact of the leading end of the clincher with a portion of the work to be riveted.

3. The structure in claim 2, and said mandrel head having a clincher end abutment surface thereabout in front of its tapered leading portion, the radial width of the abutment surface being less than the thickness of the material of the clincher and the diameter of the abutment surface being greater than the inner diameter of the clincher.

4. In a blind rivet, a rivet body having a head and a shank with a bore extending therethrough, a mandrel extending through said bore, a plug on said mandrel at least substantially as long as said rivet shank for expanding substantially the entire shank of the rivet when the mandrel is drawn through the shank, said plug having a shank entrant end and a trailing end, a head on the trailing end of the mandrel adjacent the trailing end of the plug, a clincher on said mandrel and lying about said plug, the forward portion of the clincher being more readily expandable than the end portion adjacent said mandrel head, the clincher having a uniformly strong trailing end adjacent the mandrel head, and said mandrel head having a clincher end abutment surface thereabout in front of a tapered leading portion in a position to engage the adjacent end of the clincher, the radial width of the abutment surface being less than the thickness of the material of the clincher, said rivet shank, clincher and mandrel head having substantially equal and aligned peripheries.

5. The structure in claim 1, and the clincher having a weakened portion extending from its leading end rearwardly and terminating at a point spaced from the trailing end of the clincher.

6. The structure in claim 1, and the end of the rivet shank adjacent the leading end of the clincher being tapered forwardly and outwardly to cause the clincher to expand about the rivet shank as the mandrel is pulled through the rivet shank, and the trailing end of the rivet shank being tapered rearwardly and inwardly to co-operate with the tapered end of the clincher and expand the latter.

MILO C. KETCHUM.
JAMES O. HUFFMAN.

References Cited in the file of this patent

UNITED STATES PATENTS

| Number | Name | Date |
| --- | --- | --- |
| 2,319,376 | Wallace | May 18, 1943 |
| 2,372,222 | Mullgardt | May 27, 1945 |

FOREIGN PATENTS

| Number | Country | Date |
| --- | --- | --- |
| 743,881 | France | Apr. 7, 1933 |
| 436,238 | Great Britain | Oct. 8, 1935 |